UNITED STATES PATENT OFFICE.

DAVID A. EARLY AND JOHN W. JOHNSTON, OF STAFFORDSVILLE, VIRGINIA.

LINIMENT.

SPECIFICATION forming part of Letters Patent No. 425,499, dated April 15, 1890.

Application filed September 25, 1889. Serial No. 325,069. (No specimens.)

*To all whom it may concern:*

Be it known that we, DAVID A. EARLY and JOHN W. JOHNSTON, citizens of the United States, residing at Staffordsville, in the county of Giles and State of Virginia, have invented certain new and useful Improvements in the Manufacture of a Liniment for the Relief of Man and Beast; and we do declare the following to be a full, clear, and exact description of the invention, such as will enable others skilled in the art to which it appertains to make and use the same.

The invention relates to a composition of matter to be used as a liniment for either man or beast, and it is compounded of the following ingredients taken in the following proportions: Whisky, one quart; apple (or cider) vinegar, one quart; spirits of turpentine, one quart; sweet-oil, one quart; skunk-oil, one gill; cedar-oil, one gill; gum-camphor, two ounces; eggs, two.

When the liniment is made in larger quantities, the ingredients will of course bear the same relative proportions to each other.

The liniment is compounded as follows: The gum-camphor is dissolved thoroughly in the whisky and set aside in a suitable vessel. The eggs are then thoroughly beaten up in the vinegar till a homogeneous mixture is made, which is turned and stirred in the described solution. The other ingredients are then added, the stirring being continued during the operation to cause the liniment to be of equal consistence throughout.

Having thus described our invention, we claim—

The herein-described composition of matter adapted to be used as a liniment, which consists of whisky, apple (or cider) vinegar, spirits of turpentine, sweet (or olive) oil, cedar-oil, skunk-oil, gum-camphor, and eggs, taken in the proportions described, and substantially as specified.

In testimony whereof we affix our signatures in presence of two witnesses.

DAVID A. EARLY.
JOHN W. JOHNSTON.

Witnesses:
G. W. EASLEY,
F. G. THRASHER.